(12) United States Patent
Jang et al.

(10) Patent No.: US 11,143,043 B2
(45) Date of Patent: Oct. 12, 2021

(54) TURBINE VANE, RING SEGMENT, AND GAS TURBINE INCLUDING THE SAME

(71) Applicant: DOOSAN HEAVY INDUSTRIES & CONSTRUCTION CO., LTD., Changwon-si (KR)

(72) Inventors: Yun Chang Jang, Gimhae-si (KR); Andrey Sedlov, Wurenlos (CH); Thomas Kotteck, Untersiggenthal (CH)

( * ) Notice: Subject to any disclaimer, the term of this patent is extended or adjusted under 35 U.S.C. 154(b) by 20 days.

(21) Appl. No.: 16/734,414

(22) Filed: Jan. 6, 2020

(65) Prior Publication Data
US 2020/0271004 A1    Aug. 27, 2020

(30) Foreign Application Priority Data

Feb. 26, 2019    (KR) .................. 10-2019-0022799

(51) Int. Cl.
*F01D 9/04* (2006.01)
*F02C 3/04* (2006.01)
*F02C 7/12* (2006.01)

(52) U.S. Cl.
CPC .............. *F01D 9/041* (2013.01); *F02C 3/04* (2013.01); *F02C 7/12* (2013.01); *F05D 2220/32* (2013.01); *F05D 2240/12* (2013.01); *F05D 2260/20* (2013.01)

(58) Field of Classification Search
CPC .......... F01D 9/041; F01D 5/186; F01D 5/187; F01D 5/188; F01D 5/189; F02C 3/04; F02C 7/12; F02C 25/12; F05D 2220/32; F05D 2240/12; F05D 2240/127; F05D 2260/20; F05D 2260/201; F05D 2260/2214; F05D 2260/22141; F05D 2250/15

See application file for complete search history.

(56) References Cited

U.S. PATENT DOCUMENTS 6,142,734 A * 11/2000 Lee .................. F01D 5/189
                                                416/97 R
7,497,655 B1   3/2009 Liang
(Continued)

FOREIGN PATENT DOCUMENTS

| KR | 10-2010-0097718 A | 9/2010 |
| KR | 10-2014-0071564 A | 6/2014 |
| WO | 2007-099895 A1 | 9/2007 |

*Primary Examiner* — Jesse S Bogue
*Assistant Examiner* — Loren C Edwards
(74) *Attorney, Agent, or Firm* — Harvest IP Law, LLP

(57) ABSTRACT

A turbine vane improves cooling performance by guiding an impingement cooling fluid, introduced through a cooling hole of an inner sidewall provided inside the turbine vane, to flow while in contact with an inner surface of the turbine vane for a relatively long time. The turbine vane includes an outer sidewall configured to form an airfoil comprising a leading edge and a trailing edge; an inner sidewall disposed inside the outer sidewall to form a gap between the inner sidewall and an inner surface of the outer sidewall, the inner sidewall having a plurality of cooling holes communicating with the gap; and a plurality of spiral guides formed on the inner surface of the outer sidewall and disposed at positions facing the respective cooling holes, the plurality of spiral guides configured to guide a cooling fluid having passed through the cooling holes to impinge on the spiral guides.

2 Claims, 13 Drawing Sheets

(56) References Cited

U.S. PATENT DOCUMENTS

2016/0201476 A1* 7/2016 Bunker .................. F01D 5/186
                                                     415/115
2017/0234146 A1* 8/2017 Bunker .................. F01D 5/188
                                                     416/1

* cited by examiner

TURBINE VANE, RING SEGMENT, AND GAS TURBINE INCLUDING THE SAME

CROSS-REFERENCE TO RELATED APPLICATION

This application claims priority to Korean Patent Application No. 10-2019-0022799, filed on Feb. 26, 2019, the disclosure of which is incorporated by reference herein in its entirety.

BACKGROUND

Field

Apparatuses and methods consistent with exemplary embodiments relate to a turbine vane, a ring segment, and a gas turbine including the same.

Related Art

Turbines are machines that obtain rotational force by impulsive or reaction force using the flow of a compressible fluid such as steam or gas, and include a steam turbine using steam, a gas turbine using hot combustion gas, and so on. Among these, the gas turbine largely includes a compressor, a combustor, and a turbine.

The compressor has an air inlet for the introduction of air and includes a plurality of compressor vanes and compressor blades alternately arranged in a compressor housing. The combustor supplies fuel to air compressed by the compressor and ignites the fuel-air mixture with a burner to produce high-temperature, high-pressure combustion gas. The turbine includes a plurality of turbine vanes and turbine blades alternately arranged in a turbine housing. In addition, a rotor is disposed to pass through the centers of the compressor, the combustor, the turbine, and an exhaust chamber. The rotor is rotatably supported at both ends by bearings. The rotor has a plurality of disks fixed to the rotor, and blades are connected to each of the disks. A drive shaft of a generator or similar device may be connected at one end of the exhaust chamber.

In the operation of a gas turbine as above, the air compressed by the compressor is mixed with fuel for combustion to produce hot combustion gas and the produced combustion gas is injected into the turbine. Then, the injected combustion gas generates rotational force while passing through the turbine vanes and turbine blades, thereby rotating the rotor.

Gas turbines exhibit several advantages. For example, since gas turbines have no reciprocating mechanism (e.g., the pistons of a four-stroke engine) so that mutual friction component (e.g., a piston-cylinder configuration) are absent, the consumption of lubricant is extremely low. Further, the amplitude, which is a characteristic of reciprocating machines, is greatly reduced. In addition, a gas turbine enables high-speed motion.

SUMMARY

Aspects of one or more exemplary embodiments provide a turbine vane that has a guide structure capable of improving cooling performance by guiding an impingement cooling fluid, introduced through a cooling hole of an inner sidewall provided inside the turbine vane, to flow while in contact with an inner surface of the turbine vane for a relatively long time.

Aspects of one or more exemplary embodiments provide a turbine ring segment that has a guide structure capable of improving cooling performance by guiding an impingement cooling fluid, introduced through a cooling hole of a thin plate provided in a recess of the turbine ring segment, to flow while in contact with a bottom surface of the recess for a relatively long time.

Additional aspects will be set forth in part in the description which follows and, in part, will become apparent from the description, or may be learned by practice of the exemplary embodiments.

According to an aspect of an exemplary embodiment, there is provided a turbine vane including an outer sidewall configured to form an airfoil comprising a leading edge and a trailing edge; an inner sidewall disposed inside the outer sidewall to form a gap between the inner sidewall and an inner surface of the outer sidewall, the inner sidewall having a plurality of cooling holes communicating with the gap; and a plurality of spiral guides formed on the inner surface of the outer sidewall and disposed at positions facing the respective cooling holes, the plurality of spiral guides configured to guide a cooling fluid having passed through the cooling holes to impinge on the spiral guides.

According to an aspect of another exemplary embodiment, there is provided a turbine ring segment including a ring segment body mounted on an inner peripheral surface of a turbine housing and configured to surround a turbine blade; a recess formed in the ring segment body and disposed opposite to the turbine blade; a thin plate coupled to the recess to form a gap between the thin plate and a bottom surface of the recess, the thin plate having a plurality of cooling holes communicating with the gap; and a plurality of spiral guides formed on the bottom surface of the recess and disposed at positions facing the respective cooling holes, the plurality of spiral guides configured to guide a cooling fluid having passed through the cooling holes to impinge on the spiral guides.

At least one of the spiral guides may have an engraved configuration that is formed with respect to the inner surface of the outer sidewall. The at least one of the engraved spiral guides may include a peak having a polygonal cross-section or a semicircular cross-section.

Each of the spiral guides may include an outlet disposed toward a downstream direction of the cooling fluid.

At least one of the spiral guides may have an embossed configuration that is formed with respect to the inner surface of the side wall. The at least one of the engraved spiral guides may include a peak having a polygonal cross-section or a semicircular cross-section.

The at least one of the embossed spiral guides may include a peak that is gradually lowered in height from an upstream side of the spiral guide to a downstream side of the spiral guide or a peak that is gradually raised in height from a center of the spiral guide to an edge of the spiral guide.

According to an aspect of another exemplary embodiment, there is provided a gas turbine including a compressor configured to draw and compress air; a combustor configured to produce combustion gas by mixing fuel with the compressed air for combustion; and a turbine that is housed in a turbine housing and includes a plurality of turbine blades rotated by the combustion gas and a plurality of turbine vanes fixed to the turbine housing and respectively disposed between the turbine blades. Each turbine vane is consistent with the turbine vane as above.

According to an aspect of a further exemplary embodiment, there is provided a gas turbine including a compressor configured to draw and compress air; a combustor configured to produce combustion gas by mixing fuel with the compressed air for combustion; and a turbine that is housed in a turbine housing and includes a plurality of turbine blades rotated by the combustion gas and a plurality of turbine ring segments fixed to the turbine housing to respectively surround the turbine blades. Each turbine ring segment is consistent with the turbine ring segment as above.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
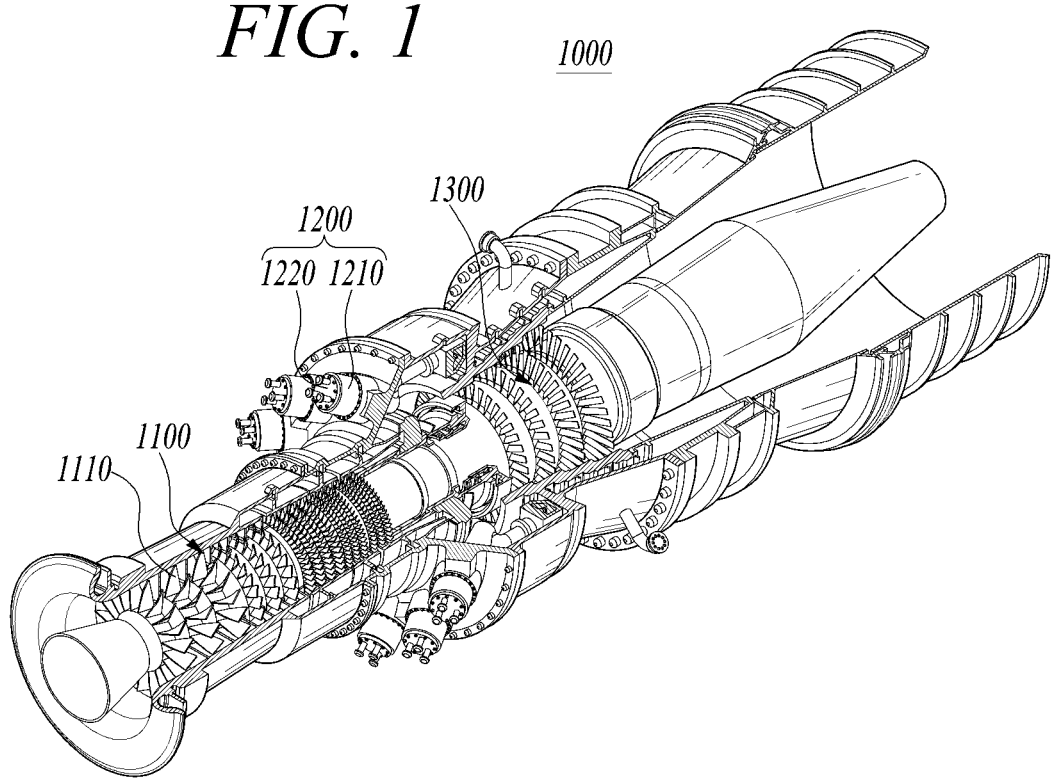
FIG. 1 is a cutaway perspective view of a gas turbine in which one or both of a turbine vane and a turbine ring segment may be applied according to an exemplary embodiment of the present disclosure.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used in the disclosure is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments will be described in detail with reference to the accompanying drawings. Throughout the disclosure, like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

FIGS. 1-4 illustrate a gas turbine 1000 according to the present disclosure.

As illustrated in FIG. 1, the gas turbine 1000 according to the exemplary embodiment includes a compressor 1100, a combustor 1200, and a turbine 1300. The compressor 1100 includes a plurality of blades 1110 arranged radially. The compressor 1100 rotates the blades 1110, and air is compressed by the rotation of the blades 1110 while flowing. The size and installation angle of each of the blades 1110 may vary depending on the blade's installation position among axially arranged rotor disks. In an exemplary embodiment, the compressor 1100 may be directly or indirectly connected to the turbine 1300, to receive a portion of the power generated by the turbine 1300 and use the received portion to rotate the blades 1110.

The air compressed by the compressor 1100 flows to the combustor 1200. The combustor 1200 includes a plurality of combustion chambers 1210 and fuel nozzle modules 1220 arranged annularly.

Figure 2:
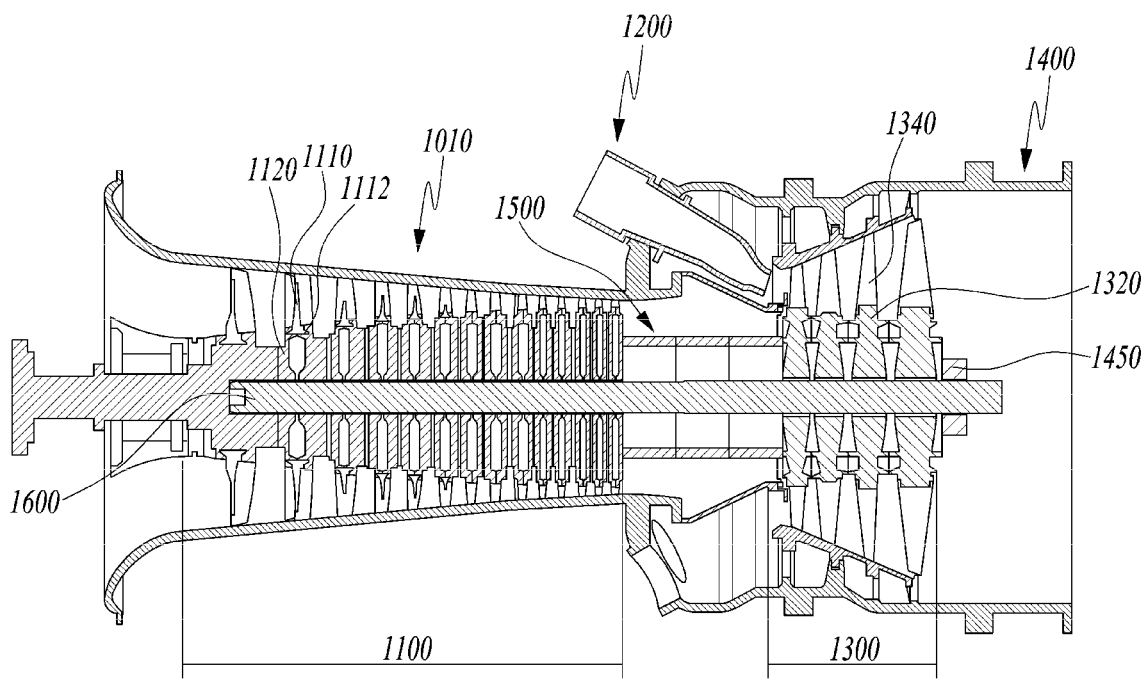
FIG. 2 is a cross-sectional view of the gas turbine of FIG. 1.

As illustrated in FIG. 2, the gas turbine 1000 includes a housing 1010 and a diffuser 1400 disposed behind the housing 1010 to discharge the combustion gas having passed through the turbine. The combustor 1200 is disposed in front of the diffuser 1400 to be supplied with the compressed air for combustion.

On the basis of the flow direction of air through the housing 1010, the compressor 1100 is disposed upstream of the turbine 1300. A torque tube 1500 is disposed between the compressor 1100 and the turbine 1300, as a torque transmission member for transmitting the rotational torque generated in the turbine 1300 to the compressor 1100.

The compressor 1100 includes a plurality (e.g., fourteen) of compressor rotor disks 1120 individually fastened by a tie rod 1600 so as not to be axially separated from each other. Specifically, the compressor rotor disks 1120 are axially aligned in the state in which the tie rod 1600 forming a rotary shaft passes through the substantial centers of the individual compressor rotor disks. Here, the compressor rotor disks 1120 are arranged so as not to be rotatable relative to each other, such that opposing surfaces of adjacent compressor rotor disks are pressed together by the tie rod 1600.

Each of the compressor rotor disks 1120 has a plurality of blades 1110 radially coupled on its outer peripheral surface. Each of the blades 1110 has a dovetail 1112 fastened to the compressor rotor disk 1120.

Compressor vanes (not illustrated) are fixed to the housing 1010 and arranged so as to be disposed between adjacent rotor disks of the compressor rotor disks 1120. The compressor vanes are fixed so as not to rotate, unlike the rotor disks, and serve to align the flow of the compressed air having passed through the blades 1110 of an upstream rotor disk 1120 to guide the air to the blades 1110 of a rotor disk 1120 positioned immediately downstream from the upstream rotor disk 1120.

The dovetail 1112 may be fastened in a tangential type or axial type, which may be selected according to the structure required for the gas turbine used. The dovetail 1112 may have a commonly known dovetail or fir-tree shape. Alternatively, the blades may be fastened to the rotor disk using a fastener, for example a fixture such as a key or a bolt.

The tie rod 1600 is disposed to pass through the centers of the compressor rotor disks 1120 and turbine rotor disks 1320. The tie rod 1600 may be a single tie rod or a plurality of tie rods. The tie rod 1600 has one end fastened to the farthest upstream compressor rotor disk and the other end fastened by a fixing nut 1450.

The tie rod 1600 may have various configurations depending on the structure of the gas turbine and is not limited to the configuration of FIG. 2 showing a single tie rod passing through the centers of the rotor disks. For example, a plurality of tie rods may be arranged circumferentially, or a combination of the single and plural tie rods may be used.

Although not illustrated in the drawings, a guide vane (deswirler) may be installed next to the diffuser in the compressor of the gas turbine, to increase the pressure of a fluid entering the inlet of the combustor and to adjust its flow angle to a design angle.

Compressed air is introduced into the combustor 1200, which mixes the air with fuel and burns the mixture to produce high-temperature, high-pressure combustion gas with high energy. The temperature of the combustion gas is increased to a heat-resistant limit of the components of the combustor and turbine through an isobaric combustion process.

The combustion system of the gas turbine may include a plurality of combustors arranged in the housing. Each of the combustors is formed as a cell and may include a burner having a fuel injection nozzle and the like, a combustor liner defining a combustion chamber, and a transition piece as the connection between the combustor and the turbine.

Specifically, the liner provides a combustion space in which the fuel injected by the fuel injection nozzle is mixed with the compressed air from the compressor so that the mixture is burned. The liner may include a flame container providing the combustion space in which the mixture of air and fuel is burned, and a flow sleeve defining an annular space while surrounding the flame container. The fuel injection nozzle is coupled to the front end of the liner, and an ignition plug is coupled to the lateral wall of the liner.

The transition piece is connected to the rear end of the liner to transfer the combustion gas, burned by the ignition plug, toward the turbine. The outer wall of the transition piece is cooled by the compressed air supplied from the compressor to prevent the transition piece from being damaged due to the high temperature of the combustion gas.

The high-temperature, high-pressure combustion gas coming out of the combustor is supplied to the turbine 1300. The supplied combustion gas impinges on the blades of the turbine and applies reaction force thereto while expanding, resulting in rotational torque. The obtained rotational torque is transmitted via the torque tube 1500 to the compressor, and power exceeding the power required to drive the compressor is used to drive a generator or the like.

The turbine 1300 basically has a structure similar to the compressor. That is, the turbine 1300 also includes a plurality of turbine rotor disks 1320 similar to the compressor rotor disks of the compressor. Accordingly, each of the turbine rotor disks 1320 also includes a plurality of turbine blades 1340 arranged radially. The turbine blades 1340 may also be coupled to the turbine rotor disk 1320 in a dovetail manner or the like.

Figure 3:
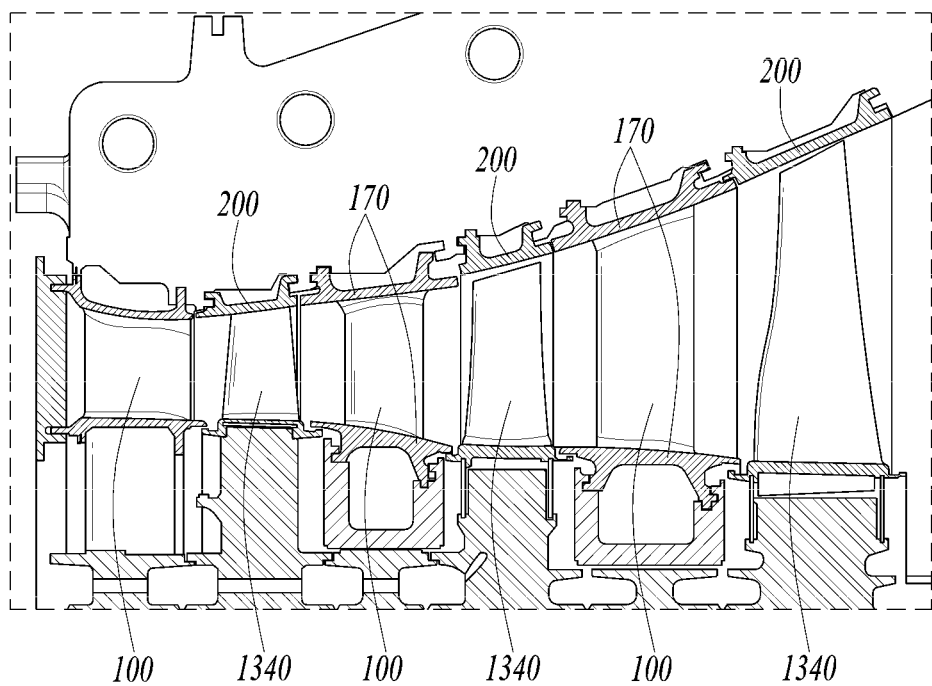
FIG. 3 is a cross-sectional view of a portion of the gas turbine of FIG. 1.

Referring to FIG. 3, each of a plurality of turbine vanes 100 fixed in the housing is respectively provided between the blades 1340 of any adjacent pair of turbine rotor disk 1320, including a position upstream of the blades 1340 of the farthest upstream turbine rotor disk 1320, to guide the flow direction of the combustion gas having passed through the blades. Each of the turbine vanes 100 has inner and outer endwalls 170 for fixedly mounting the turbine vane 100 in the housing. Meanwhile, a ring segment 200 is fixedly mounted in the housing so as to be disposed at a position facing the outer ends of the rotating turbine blades 1340 of each turbine rotor disk, while forming a predetermined clearance with the outer ends of the turbine blades 1340.

Figure 4:
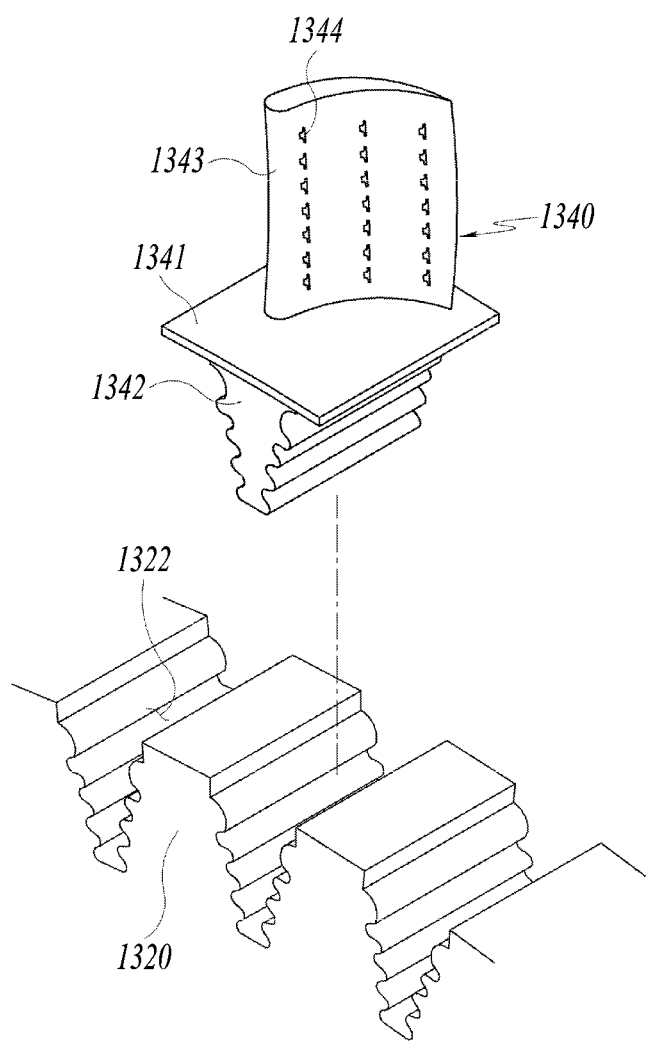
FIG. 4 is an exploded perspective view of a turbine rotor disk of the gas turbine as shown in FIG. 2.

Referring to FIG. 4, each of the turbine rotor disks 1320 has a plurality of coupling slots 1322 formed on its outer peripheral portion. Each of the coupling slots 1322 has a fir-tree-shaped surface formed in the outer periphery of the turbine rotor disk 1320, which has a substantially disk shape.

Each of the turbine blades 1340 is fastened to an associated one of the coupling slots 1322 and includes a flat platform part 1341 formed at its substantial center. The plurality of platform parts 1341 corresponding to the plurality of turbine blades 1340 serve to maintain the distance between the blades circumferentially, since the circumferential sides of each platform part 1341 are respectively in contact with a circumferential side of the platform part 1341 of any adjacent turbine blade.

A root part 1342 is formed on an underside of the platform part 1341. The root part 1342 has an axially extending structure configured to be inserted into the coupling slot 1322 of the rotor disk 1320 in the axial direction of the rotor disk 1320. For a coupling structure, the root part 1342 has a substantially fir-tree shape corresponding to the fir-tree-shaped surface formed in the coupling slot 1322. Alternatively, the coupling structure of the root part 1342 and the coupling slot 1322 may have a dovetail shape.

A blade part 1343 is formed on the upper surface of the platform part 1341. The blade part 1343 may be formed to have an optimized airfoil shape according to the specification of the gas turbine. On the basis of the flow direction of combustion gas across the turbine blade 1340, the blade part 1343 has a leading edge disposed upstream and a trailing edge disposed downstream.

Unlike the blades of the compressor, the blades of the turbine come into direct contact with high-temperature, high-pressure combustion gas. Since the temperature of the combustion gas is as high as 1700° C., there is a need for a cooling means. To this end, a cooling passage is defined in which compressed air is bled from some points of the compressor and supplied to the blades of the turbine. The cooling passage may extend outside the housing (external passage) or through the inside of the rotor disk (internal passage). The cooling passage may be formed by both of an external passage and an internal passage.

As shown in FIG. 4, the blade part may have a plurality of film cooling holes 1344 formed on its surface. The film cooling holes 1344 communicate with a cooling passage (not illustrated) defined in the blade part 1343 to supply cooling air to the surface of the blade part 1343.

The blade part 1343 of the turbine is rotated by combustion gas in the housing. There is a clearance between the tip of the blade part 1343 and the inner surface of the housing such that the blade part is smoothly rotatable. However, since the combustion gas may leak through the clearance as described above, a sealing means for blocking the leakage of the combustion gas is required.

Each of the turbine blades and turbine vanes has an airfoil shape, and includes a leading edge, a trailing edge, a suction side, and a pressure side. The turbine blade and the turbine vane each include a complicated labyrinth structure internally that forms a cooling system. Cooling circuits in each of the blade and vane receive a cooling fluid, e.g., air from the compressor of the gas turbine, so that the fluid passes through the end of the blade or vane configured to couple to a blade or vane carrier. The cooling circuits typically include a plurality of flow paths designed to maintain all surfaces of the turbine blade or vane at a relatively uniform temperature, and at least a portion of the fluid having passed through the cooling circuits is discharged through the openings of the leading edge, trailing edge, suction side, and pressure side of the blade or vane.

Among the cooling circuits in each of the blade and vane, an impingement cooling circuit is configured such that an insert or inner sidewall, which is spaced apart from an outer sidewall of the blade or vane at a predetermined interval, is inserted into an internal chamber and a cooling fluid is introduced through a plurality of cooling holes formed in the inner sidewall to cool the inner surface of the outer sidewall. The cooling fluid, especially the cooling air, having passed through the inner sidewall is referred to as an impingement jet, and the action by which the impingement jet cools the inner surface of the outer sidewall is referred to as impingement cooling.

The impingement jet is divided into a gap flow and a film cooling flow. The gap flow cools the vane (or blade) by flowing through the inner sidewall into a gap between the inner sidewall and the outer sidewall and toward a cut-back. The film cooling flow cools the outer sidewall while flowing out of the vane (or blade) through the film holes of the outer sidewall.

FIGS. 5, 6, 7, and 8A-8C illustrate a turbine vane 100 according to a first example of the present disclosure.

The turbine vane 100 includes an outer sidewall 120 that is in the form of an airfoil including a leading edge 101 and a trailing edge 103, a partition 130, an inner sidewall 150, and a plurality of spiral guides 300. The partition 130 partitions a path in which the cooling fluid introduced into the turbine vane 100 flows. The inner sidewall 150 is installed in the turbine vane 100 and is disposed so as to be separated from an inner surface 122 of the outer sidewall 120 in order to form a gap (interval space) between the outer sidewall 120 and the inner sidewall 150. The inner sidewall 150 has a plurality of cooling holes 151 formed through the inner sidewall 150 so that the path in which the cooling fluid is introduced into the turbine vane 100 communicates with the interval space of the gap. The plurality of spiral guides 300 are formed at positions facing the respective cooling holes 151 on the inner surface of the outer sidewall 120 in order to guide the cooling fluid having passed through the cooling holes to impinge on the guides 300.

According to the present disclosure, the inner sidewall 150 may be in the form of an insert as a separate component that is inserted into the outer sidewall 120 to form a gap therebetween. On the other hand, the inner sidewall 150 may be provided integrally as part of the outer sidewall 120. In either case, the inner sidewall 150 is disposed inside the outer sidewall 120 to form a gap G between the inner sidewall 150 and an inner surface of the outer sidewall 120, and the inner sidewall 150 has a plurality of cooling holes 151 communicating with the gap G.

The outer sidewall 120 has a plurality of film holes 121 formed therethrough to be inclined slightly downstream. A cut-back 140 is formed at the trailing edge 103 of the airfoil formed by the outer sidewall 120.

The space surrounded by the partition 130 and the outer sidewall 120 is partitioned into a first inflow chamber 102 near the leading edge 101 and a second inflow chamber 104 near the trailing edge 103.

The cooling holes 151 are formed perpendicularly (not inclined) through the inner sidewall 150 and thus face the inner surface of the outer sidewall 120.

The cooling fluid, i.e., cooling air introduced through the inflow chambers 102 and 104, cools the outer sidewall 120 by flowing through the cooling holes 151 and into a gap G between the outer sidewall 120 and the inner sidewall 150.

In addition, the cooling air introduced into the gap G directly cools the outer surface of the outer sidewall 120 while passing through the film holes 121. The cooling by such a flow is referred to as film cooling.

Figure 5:
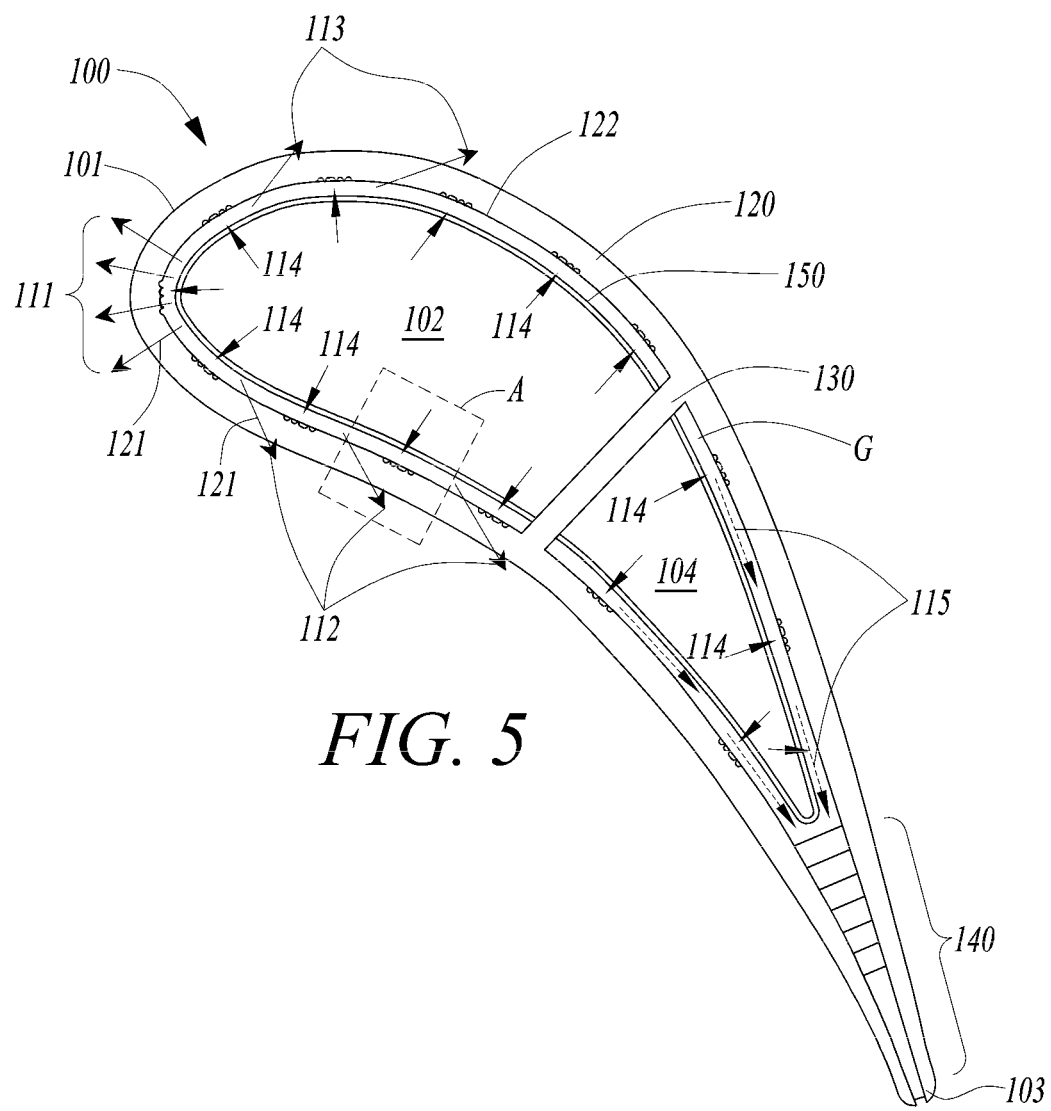
FIG. 5 is a cross-sectional view of a turbine vane according to an exemplary embodiment of the present disclosure.

The film holes 121 may be formed at the leading edge 101 of the outer sidewall 120 and upstream of the pressure side and suction side of the vane, thereby sequentially forming a first film cooling flow 111, a second film cooling flow 112, and a third film cooling flow 113 as illustrated in FIG. 5.

The distance between the cooling holes 151 may vary for each portion of the vane 100 since the portions of the vane 100 require different degrees of cooling. For example, since a leading edge portion, indicated by which the first film cooling flow 111 occurs maximally in FIG. 5, is in maximum contact with hot air, the leading edge portion requires the greatest degree of cooling. Therefore, the smallest distance between the film holes 121 is preferred in the leading edge portion.

Likewise, the cooling holes 151 of the inner sidewall 150 through which each fluid passes primarily may be distributed more in the leading edge portion.

A portion of a gap flow 115 in the gap G between the inner sidewall 150 and the outer sidewall 120 is directed to the film cooling flows 111, 112, and 113, and the other is directed to the cut-back 140.

In the gap flow 115, a cooling fluid flows from the leading edge 101 to the trailing edge 103, and the cooling holes 151 are arranged from a portion near the leading edge 101 to be spaced at predetermined intervals from each other.

Figure 6:
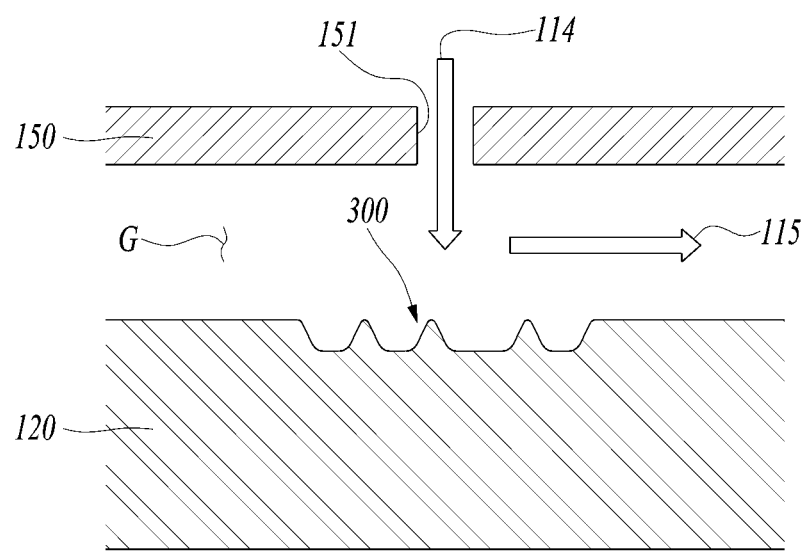
FIG. 6 is an enlarged view of portion "A" of FIG. 5 and illustrates impingement cooling according to a first example.

FIG. 6 illustrates the flow and direction of an impingement jet 114 and the direction of a gap flow 115. The impinging jet 114 is introduced into the gap G through the cooling holes 151. The impinging jet 114 introduced through the cooling holes 151 impinges on the guides 300 formed on the inner surface of the outer sidewall 120 and then flows in a direction parallel to the inner surface of the outer sidewall 120. Thus, the flow direction of the impinging jet 114 may be changed to the direction of the gap flow 115.

The guides 300 are formed at positions facing the respective cooling holes 151 on the inner surface of the outer sidewall 120, to guide the cooling fluid introduced through the cooling holes 151 to be in contact with and flow on the inner surface of the outer sidewall 120 for a relatively long time while impinging on the inner surface of the outer sidewall 120. That is, the cooling fluid introduced through the cooling holes 151 tends to reside on the inner surface of the outer sidewall 120.

Figure 7:
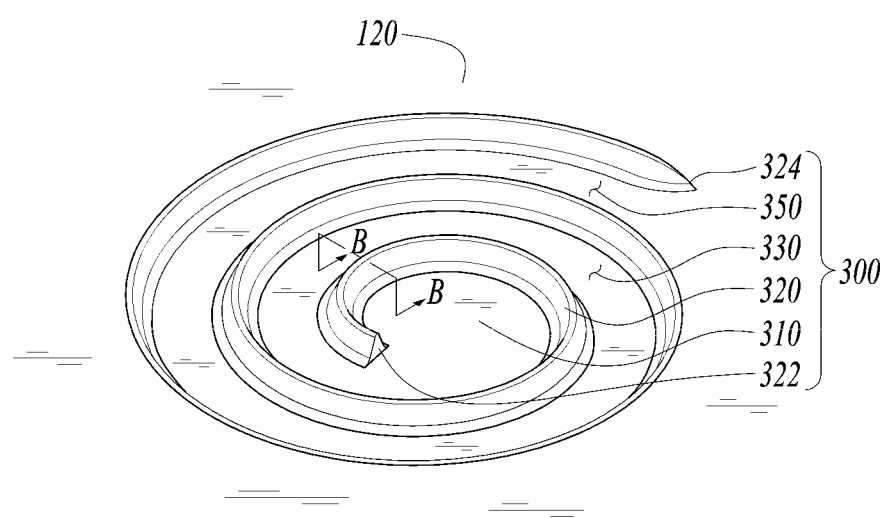
FIG. 7 is a perspective view of a guide formed on an outer sidewall according to the first example.

Each of the guides 300 formed on the inner surface of the outer sidewall 120 may have an engraved or embossed configuration with respect to the inner surface of the outer sidewall 120. Also, the guides 300 of the present disclosure, which are formed at various locations on the inner surface of the outer sidewall 120, may include a combination of engraved and embossed spiral guides. FIGS. 6 and 7 illustrate one engraved spiral guide 300.

As illustrated in FIG. 7, the guide 300 may include a spiral peak 320 and a valley 330 formed therebetween in cross-section. The upper end of the peak 320 of an engraved guide may have the same height as the inner surface of the outer sidewall 120, or may be lower than the inner surface of the outer sidewall 120, as shown in FIG. 6. The valley 330 may be formed between the facing peaks 320 in cross-section and have a planar shape that is lower than the inner surface of the outer sidewall 120.

The peak 320 may have a starting point 322 disposed near a center 310 of the guide 300. The peak 320 may have an end point 324 disposed farthest from the center 310 of the guide 300, and an outlet 350 may be formed between the peaks 320 in cross-section and at a position in which the valley 330 ends.

Figures 8A, 8B, 8C:
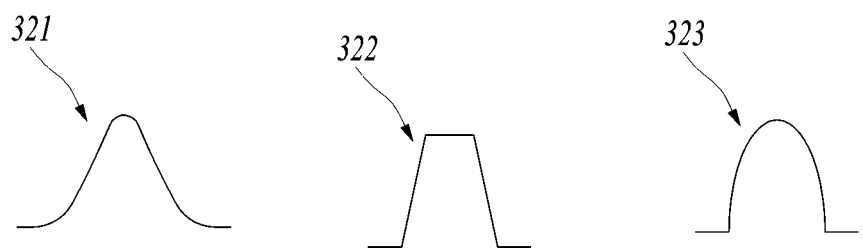
FIGS. 8A-8C are cross-sectional views of examples of a peak of the guide taken along line "B-B" of FIG. 7.

As illustrated in FIG. 8A, the engraved spiral guide may have a peak 321 that is generally triangular in cross-section, among polygonal shapes. That is, the cross-section of the peak 321 may be generally triangular as a whole. Particularly, the peak 321 may have an isosceles triangular shape cross-sectionally. However, in an engraved guide 300, the outer surface of the outermost portion of the peak 321 communicates with the inner surface of the outer sidewall 120 and is flush with the inner surface of the outer sidewall 120. It is preferable that the upper vertex of the triangular peak 321 is rounded and that both sides of the peak 321 are rounded at their lower ends to be connected integrally to the outer sidewall 120 with no abrupt bending, to enhance the strength and durability of the guide by preventing the concentration of stress on the guide.

As illustrated in FIG. 8B, the engraved spiral guide may have a peak 322 that is generally rectangular in cross-section, among polygonal shapes. That is, the cross-section of the peak 322 may be generally rectangular as a whole. Particularly, the peak 322 may have a trapezoidal shape cross-sectionally, whereby its upper end is smaller than its lower end. However, in an engraved guide 300, the outer surface of the outermost portion of the peak 322 communicates with the inner surface of the outer sidewall 120 and is flush with the inner surface of the outer sidewall 120. It is preferable that the upper vertex of the trapezoidal peak 322 is rounded and that both sides of the peak 322 are rounded at their lower ends to be connected integrally to the outer sidewall 120 with no abrupt bending, to enhance the strength and durability of the guide by preventing the concentration of stress on the guide.

As illustrated in FIG. 8C, the engraved spiral guide may have a peak 323 that is generally semicircular in cross-section. That is, the cross-section of the peak 323 may be generally semicircular as a whole. Particularly, the peak 323 may have a vertically elongated, semielliptical shape cross-sectionally. However, the outer surface of the outermost portion of the peak 323 may be connected to the inner surface of the outer sidewall 120 flush therewith. However, in an engraved guide 300, the outer surface of the outermost portion of the peak 323 communicates with the inner surface of the outer sidewall 120 and is flush with the inner surface of the outer sidewall 120. It is preferable that both sides of the semicircular peak 323 are rounded at their lower ends to be connected integrally to the outer sidewall 120 with no abrupt bending, to enhance the strength and durability of the guide by preventing the concentration of stress on the guide.

FIGS. 9, 10, and 11A-11C illustrate a spiral guide 300 of the turbine vane 100 according to a second example of the present disclosure.

Figure 9:
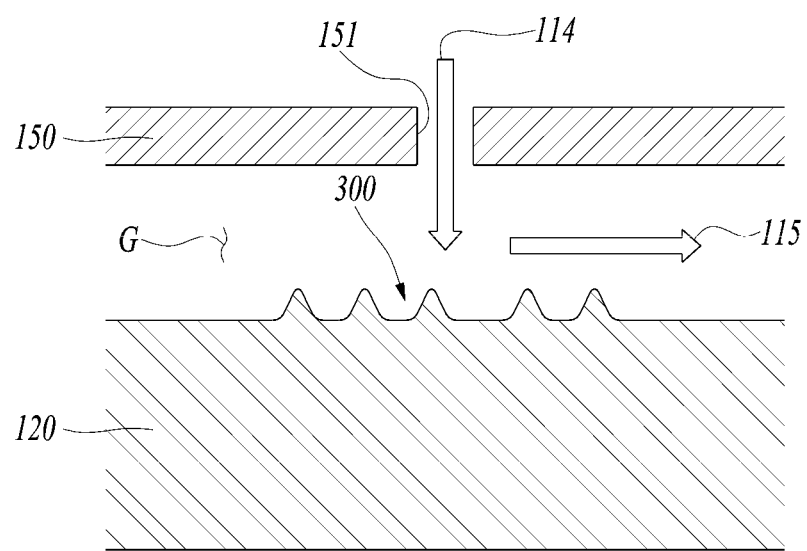
FIG. 9 is an enlarged view of portion "A" of FIG. 5 and illustrates impingement cooling according to a second example.

FIG. 9 illustrates the flow and direction of an impingement jet 114 and the direction of a gap flow 115. The impinging jet 114 is introduced into the gap G through the cooling holes 151. The impinging jet 114 introduced through the cooling holes 151 impinges on the guides 300 formed on the inner surface of the outer sidewall 120 and then flows in a direction parallel to the inner surface of the outer sidewall 120. Thus, the flow direction of the impinging jet 114 may be changed to the direction of the gap flow 115.

As in the case of the first example, the guides 300 of the second example are formed at positions facing the respective cooling holes 151 on the inner surface of the outer sidewall 120, to guide the cooling fluid introduced through the cooling holes 151 to be in contact with and flow on the inner surface of the outer sidewall 120 for a relatively long time while impinging on the inner surface of the outer sidewall 120. That is, the cooling fluid introduced through the cooling holes 151 tends to reside on the inner surface of the outer sidewall 120.

Each of the guides 300 according to the second example has an embossed configuration that protrudes from the inner surface of the outer sidewall 120.

Figure 10:
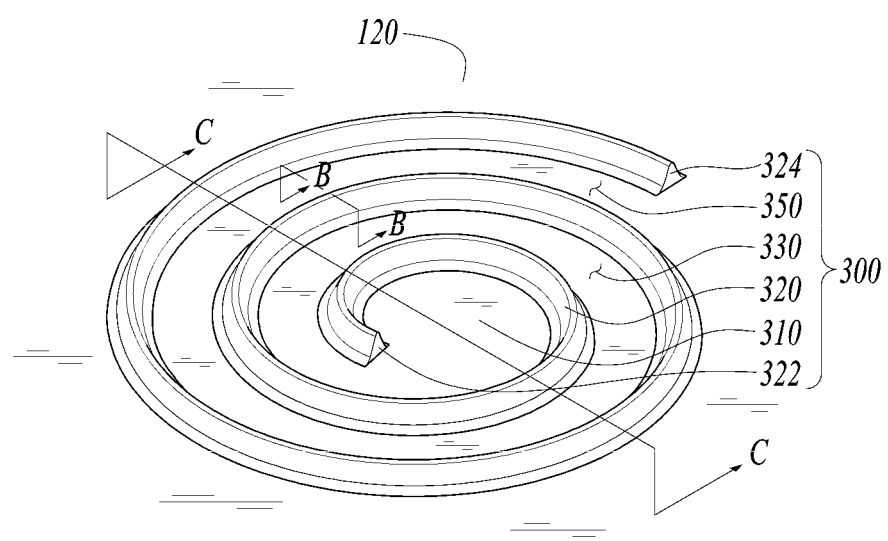
FIG. 10 is a perspective view of a guide formed on an outer sidewall according to the second example.

As illustrated in FIG. 10, the guide 300 may include a spiral peak 320 and a valley 330 formed therebetween in cross-section. The upper end of the peak 320 of an embossed guide may be formed higher than the inner surface of the outer sidewall 120, as shown in FIG. 9. The valley 330 may be formed between the facing peaks 320 in cross-section and may have a planar shape that is lower than the inner surface of the outer sidewall 120.

As in the case of the first example, the peak 320 of the second example may have a starting point 322 disposed near a center 310 of the guide 300. The peak 320 may have an end point 324 disposed farthest from the center 310 of the guide 300, and an outlet 350 may be formed between the peaks 320 in cross-section and at a position in which the valley 330 ends.

Figures 11A, 11B, 11C:
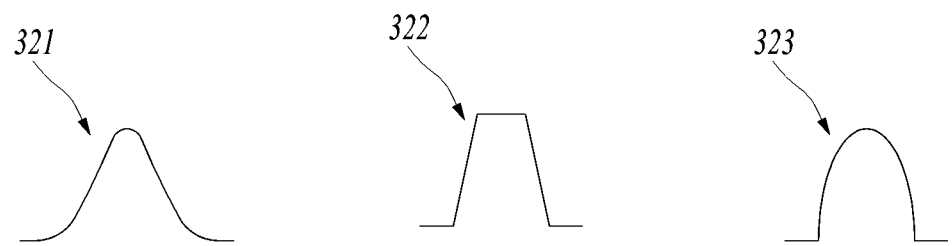
FIGS. 11A-11C are cross-sectional views of examples of a peak of the guide taken along line "B-B" of FIG. 10.

As illustrated in FIGS. 11A-11C, the embossed spiral guide 300 may have a peak 321, 322, or 323 as in the case of the first example. However, in an embossed guide 300, which protrudes from the inner surface of the outer sidewall 120, the outer surface of the outermost portion of the peak 323 is structured the same as the outer surface of the other portions of the peak 323. The peaks 321, 322, and 323 of the second example may otherwise be structured the same in the first example.

Figure 12A:
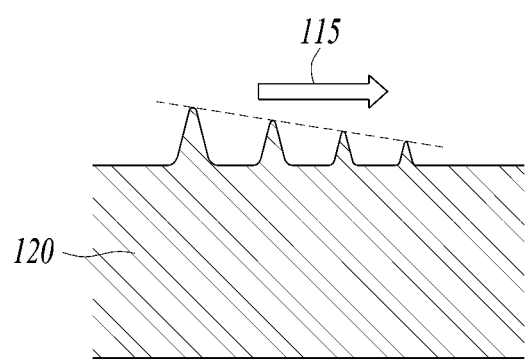
FIGS. 12A and 12B are cross-sectional views of other examples of the guide taken along line "C-C" of FIG. 10.
Figure 12B:
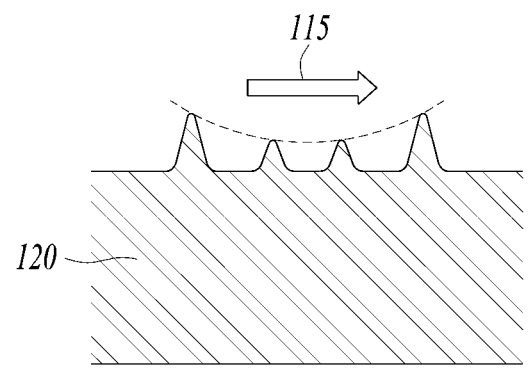

FIGS. 12A and 12B illustrate alternatively structured peaks of the spiral guide as shown in FIG. 9. Although not expressly shown, the heights of the peaks of the spiral peak 320 of the guide 300 of the first example may be similarly varied in the upstream and downstream directions shown in FIG. 6.

As illustrated in FIG. 12A, the spiral peak 320 may be gradually lowered in height from upstream to downstream on the basis of the flow direction of the cooling fluid.

The cooling air, i.e., impingement jet 114, having passed through the cooling holes 151 impinges on the guide 300 and is then spread in all directions of 360 degrees. In this case, most of the cooling air impinges on the center 310 of the guide 300 and is then guided to flow along the valley 330 by the peak 320.

Some of the cooling air may flow beyond the peak 320. When the outlet 350 of the guide 300 is directed to the right in FIG. 12A, the cooling air is finally guided to flow to the right. Thus, the imaginary plane passing through the vertexes of the peaks 320 is inclined downward from upstream to downstream (left to right), thereby enabling the gap flow 115 to be smoothly directed downstream.

As illustrated in FIG. 12B, the spiral peak 320 may be gradually raised in height from its center to its edge.

The impingement jet 114 impinges on the center 310 of the guide 300 and is then guided such that most of the impingement jet flows in a spiral form by the surrounding peak 320. Some of the impingement jet 114 may tend to flow beyond the peak 320 around the center 310. However, in this case, since the outermost portion of the peak 320 of the guide 300 is high, the impingement jet 114 tends to not passes beyond the outermost portion of the peak 320. Thus, most of the cooling air may be guided to flow through the outlet 350.

Figure 13:
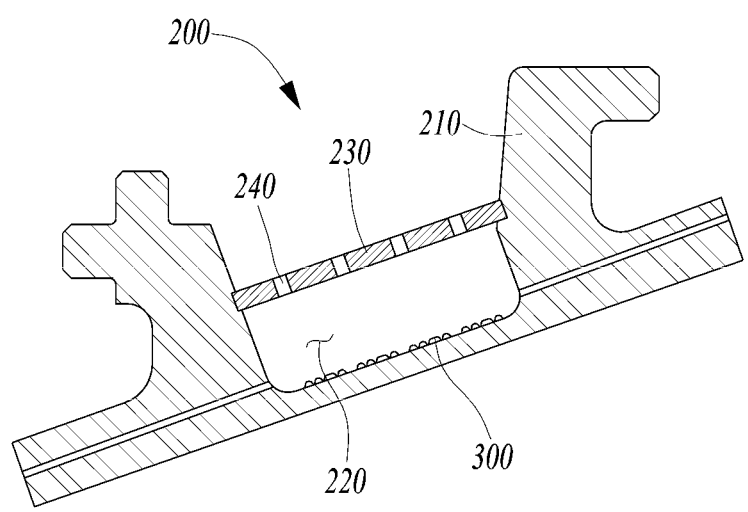
FIG. 13 is a cross-sectional view of a turbine ring segment according to an exemplary embodiment of the present disclosure.

FIG. 13 illustrates a turbine ring segment 200 according to an exemplary embodiment of the present disclosure.

The turbine ring segment 200 is fixedly mounted at a position facing the outer end of each turbine blade 1340 that rotates in a turbine housing. The turbine ring segment 200 includes a body 210 that may be divided into a plurality of parts to surround a plurality of turbine blades. The body 210 may be continuously and circumferentially arranged and may be mounted on the inner peripheral surface of the turbine housing.

The turbine ring segment 200 includes a recess 220 formed opposite to the turbine blade in the body 210. A thin plate 230 may be provided in the recess 220. The thin plate 230 is coupled to the body 210 forms a gap between the thin plate 230 and the bottom surface of the recess 220. The thin plate 230 has a plurality of cooling holes 240 communicating with the gap. The thin plate 230 may be coupled to both sides of the recess 220 by welding.

The bottom surface of the recess 220 is provided with a plurality of guides 300 having a spiral form to guide the flow of the cooling fluid through the gap. The air introduced through the cooling holes 240 may impinge on the bottom surface of the recess 220 and then flow in a direction parallel to the bottom surface of the recess 220 to cool the turbine ring segment 200.

The guides 300 are formed at positions facing the respective cooling holes 240 on the bottom surface of the recess 220 and each has a spiral shape. Each of the guides 300 may have an embossed or engraved spiral shape on the bottom surface of the recess 220. The above embodiments described with respect to the arrangement and shapes of the guides 300 configured to guide the impingement cooling flow between the outer sidewall 120 and the inner sidewall 150 inserted into the turbine vane 100 may be applied to the guides 300 of the turbine ring segment 200. Thus, a detailed description of various examples of the turbine ring segment 200 including the guides 300 will be omitted.

As is apparent from the above description, according to the turbine vane of the exemplary embodiments, cooling performance in a gas turbine can be improved by guiding the impingement cooling fluid, introduced through the cooling hole of the inner sidewall provided inside the turbine vane, into a spiral guide to enable the cooling fluid to flow while in contact with the inner surface of the turbine vane for a relatively long time.

In addition, according to the turbine ring segment of the exemplary embodiments, cooling performance in a gas turbine can be improved by guiding the impingement cooling fluid, introduced through the cooling hole of the thin plate provided in the recess of the turbine ring segment, into a spiral guide to enable the cooling fluid to flow while in contact with the bottom surface of the recess for a relatively long time.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A turbine vane comprising:
an outer sidewall configured to form an airfoil comprising a leading edge and a trailing edge;
an inner sidewall disposed inside the outer sidewall to form a gap between the inner sidewall and an inner surface of the outer sidewall, the inner sidewall having a plurality of cooling holes communicating with the gap; and
a plurality of spiral guides formed on the inner surface of the outer sidewall and disposed at positions facing the respective cooling holes, the plurality of spiral guides configured to guide a cooling fluid having passed through the cooling holes to impinge on the spiral guides,
wherein at least one of the spiral guides has an embossed configuration that is formed with respect to the inner surface of the outer sidewall, and
wherein the at least one of the spiral guides includes a peak that is gradually raised in height from a center of the respective spiral guide to an edge of the respective spiral guide.

2. A gas turbine comprising:
a compressor configured to draw and compress air creating a compressed air;
a combustor configured to produce a combustion gas by mixing fuel with the compressed air for combustion;
a turbine that is housed in a turbine housing and includes a plurality of turbine blades rotated by the combustion gas and a plurality of turbine vanes fixed to the turbine housing and respectively disposed between the turbine blades, each turbine vane comprising:
an outer sidewall configured to form an airfoil comprising a leading edge and a trailing edge;
an inner sidewall disposed inside the outer sidewall to form a gap between the inner sidewall and an inner surface of the outer sidewall, the inner sidewall having a plurality of cooling holes communicating with the gap; and
a plurality of spiral guides formed on the inner surface of the outer sidewall and disposed at positions facing the respective cooling holes, the plurality of spiral guides configured to guide a cooling fluid having passed through the cooling holes to impinge on the spiral guides,
a turbine ring segment mounted on an inner peripheral surface of the turbine housing, the turbine ring segment comprising:
a ring segment body configured to surround the plurality of turbine blades;
a recess formed in the ring segment body and disposed opposite to the turbine blades;
a thin plate coupled to the recess to form a second gap between the thin plate and a bottom surface of the recess, the thin plate having a second plurality of cooling holes communicating with the second gap; and a second plurality of spiral guides formed on the bottom surface of the recess and disposed at positions facing the respective second plurality of cooling holes, the second plurality of spiral guides configured to guide a second cooling fluid having passed through the second plurality of cooling holes to impinge on the second plurality of spiral guides.

* * * * *